United States Patent [19]

Takeshita et al.

[11] Patent Number: 4,516,451
[45] Date of Patent: May 14, 1985

[54] APPARATUS FOR CUTTING AN ELONGATE RUBBERY STRIP

[75] Inventors: Masaru Takeshita, Kodaira; Toshio Tokunaga; Yuichiro Ogawa, both of Fuchu, all of Japan

[73] Assignee: Bridgestone Tire Company Limited, Tokyo, Japan

[21] Appl. No.: 487,278

[22] Filed: Apr. 21, 1983

[30] Foreign Application Priority Data

May 24, 1982 [JP] Japan .................. 57-87712

[51] Int. Cl.³ .................. B26D 7/10; B26D 7/26
[52] U.S. Cl. .................. 83/171; 83/455; 83/581; 83/614; 83/486.1
[58] Field of Search ........... 83/171, 614, 385, 486, 83/486.1, 455, 581, 488; 156/134, 135

[56] References Cited

U.S. PATENT DOCUMENTS

| 1,888,744 | 11/1932 | Shook | 83/488 |
| 3,429,490 | 2/1969 | Cancarutti | 83/614 |
| 3,641,855 | 2/1972 | Balle | 83/171 |
| 3,732,767 | 5/1973 | Habert | 83/171 |
| 3,789,712 | 2/1974 | Enders | 83/171 |
| 3,859,152 | 1/1975 | Brey et al. | 83/614 |
| 3,964,360 | 6/1976 | Schwartz | 83/581 |
| 3,973,459 | 8/1976 | Stowe | 83/581 |
| 4,010,664 | 3/1977 | Marshall | 83/614 |
| 4,334,448 | 6/1982 | Messerschmitt | 83/171 |

FOREIGN PATENT DOCUMENTS 1186209 1/1965 Fed. Rep. of Germany .

Primary Examiner—Frank T. Yost
Assistant Examiner—Hien H. Phan
Attorney, Agent, or Firm—Cushman, Darby & Cushman

[57] ABSTRACT

For cutting an elongate rubbery strip, there is disclosed an apparatus which largely comprises transmitting means operative to transmit the elongate rubbery strip to a predetermined position, an anvil located underneath the predetermined position and formed with an elongated groove extending at angle with respect to the transverse direction of the rubbery strip, the angle between the longitudinal direction of the elongated groove and the transverse direction of the rubbery strip being variable by means of adjusting means. The apparatus for cutting the elongate rubbery strip further comprises a cutting mechanism operative to cut the elongate rubbery strip on bias throughout the width thereof in cooperation with the anvil.

1 Claim, 11 Drawing Figures

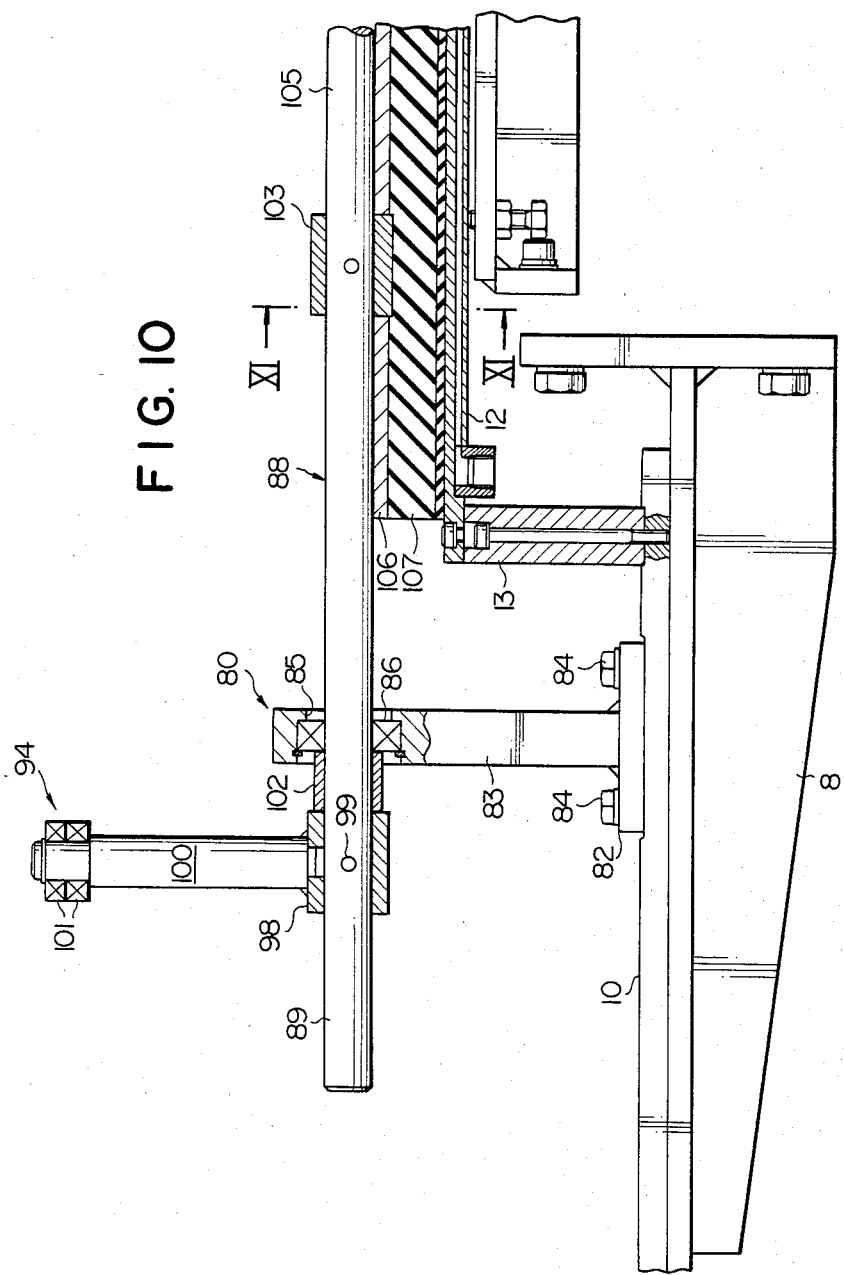

4,516,451

APPARATUS FOR CUTTING AN ELONGATE RUBBERY STRIP

FIELD OF THE INVENTION

The present invention relates to an apparatus for cutting an elongate rubbery strip and particularly to an apparatus for cutting an elongate non-vulcanized rubbery strip on bias for use in, for example, manufacturing a pneumatic tire.

BACKGROUND OF THE INVENTION

During manufacturing of a pneumatic tire, it is necessary to prepare a plurality of rubbery segments so as to build up them into a band by a band building machine. In order to prepare a plurality of rubbery segments, there have been proposed various types of cutting apparatus which are operative to cut an elongate non-vulcanized rubbery strip such as, for example, raw rubber into a plurality of segments on bias. Such oblique cutting surfaces of each segments contribute to increase in adhesion when both cutting surfaces are jointed to each other.

One of such cutting apparatus is known as "guillotine cutter" and largely comprises an anvil located immediately underneath the elongate non-vulcanized rubbery strip and a cutting plate upwardly spaced apart substantially in parallel from the anvil and extending obliquely to the transverse direction of the rubbery strip, the cutting plate being movable toward and away from the anvil so as to cut the rubbery strip on bias in cooperation with the anvil. The cutting plate is, namely, driven to move so as to be in contact with the rubbery strip throughout the length thereof and, then, pressed against the anvil through the thickness of the elongate rubbery strip for cutting off the rubbery segment from the elongate rubbery strip. A problem has been encountered in the prior-art cutting apparatus of above described nature in that a better surface finish can not be obtained due to viscoelasticity of the rubbery strip if the cutting plate is moved on a plane directed away from the upper surface of the rubbery strip at an angle less than about 45 degrees.

Another prior-art cutting apparatus for cutting the rubbery strip on bias is known as "ring cutter" and largely comprises a ring-shaped cutting tool driven for rotation by a suitable power source and transfer mechanism operative to move the cutting tool obliquely to the transverse direction of the rubbery strip. As the cutting tool produces a large amount of swarf, a problem has been encountered in another prior-art cutting apparatus of above described nature in that the swarf is attracted onto the rubbery strip. This results in deterioration in quality of the rubbery segments. Furthermore, another problem has been encountered in another prior-art cutting apparatus in that the rubbery strip is liable to twine about the cutting tool as a result of rotation thereof.

The present invention contemplates resolution of these problems inherent in the prior-art cutting apparatus of the nature.

SUMMARY OF THE INVENTION

In accordance with the present invention there is provided an apparatus for cutting an elongate rubbery strip movable on a predetermined plane and having longitudinal and transverse directions comprising transmitting means operative to transmit the elongate rubbery strip in the longitudinal direction thereof and to be brought to a stop when the elongate rubbery strip reaches a predetermined longitudinal position on the predetermined plane, an anvil located underneath the predetermined plane and formed with an elongated groove extending obliquely to the transverse direction of the elongate rubbery strip, a cutting mechanism arranged in opposing relation with the anvil across the predetermined plane and provided with a cutting device having a cutting edge portion, a heating device operative to heat the cutting edge portion of the cutting device to a predetermined temperature, a driving device operative to move the cutting device into or out of a cutting position in which the cutting edge portion of the cutting device is received in the elongated groove of the anvil through the elongate rubberly strip in the predetermined longitudinal position and transfer device operative to move the cutting device along the elongated groove of the anvil when the cutting device is assumed to be in the cutting position, the cutting device being operative to cut the elongate rubbery strip on bias throughout the width thereof in cooperation with the anvil when the cutting device is moved along the elongated groove of the anvil, biasing means shiftable into or out of a pressing position in which the biasing means presses the elongate rubbery strip against the anvil for maintaining the elongated rubbery strip in the predetermined longitudinal position, and adjusting means operative to adjust positions of the anvil and the cutting mechanism with respect to the elongate rubbery strip in the predetermined longitudinal position.

The apparatus according to the present invention may be useful if the elongate rubbery strip is formed of non-vulcanized rubber. The cutting device may have a lower surface directed away from the upper surface of the elongate rubbery strip at an angle ranging between about 10 degrees and about 40 degrees when the cutting device assumed in said cutting position. Furthermore, the cutting edge portion may be constituted by upper and lower surfaces, the upper surface of the cutting edge portion being directed from the lower surface of the cutting edge portion at an angle ranging between about 5 degrees and about 20 degrees.

On the other hand, the anvil may have an upper surface substantially in parallel with the predetermined plane, an inner surface directed away from the upper surface at an acute angle and a guide surface spaced apart from the inner surface, the inner surface and the guide surface forming in combination said elongated groove, the guide surface extending substantially in parallel with the lower surface of the cutting device when the cutting device is assumed in the cutting position. Furthermore, the guide surface may be spaced apart from the lower surface of the cutting device by a distance falling within a range between about 0.0 mm and about 0.2 mm.

The biasing means may be in contact with the upper surface of the anvil across the elongate rubbery strip throughout the width of the elongate rubbery strip. The cutting edge portion may be directed away from the upper surface of the elongate rubbery strip at an angle ranging between about 5 degrees and 20 degrees when the cutting device is moved along the elongated groove of the anvil.

BRIEF DESCRIPTION OF THE DRAWINGS

The present invention will be more clearly understood from the following detailed description taken in conjunction with the accompanying drawings in which like reference numerals designate similar or corresponding members, elements, devices and means and in which:

FIG. 10 is a fragmentary cross sectional view taken along the line X—X in FIG. 5.

DESCRIPTION OF THE PREFERRED EMBODIMENT

Figure 1:
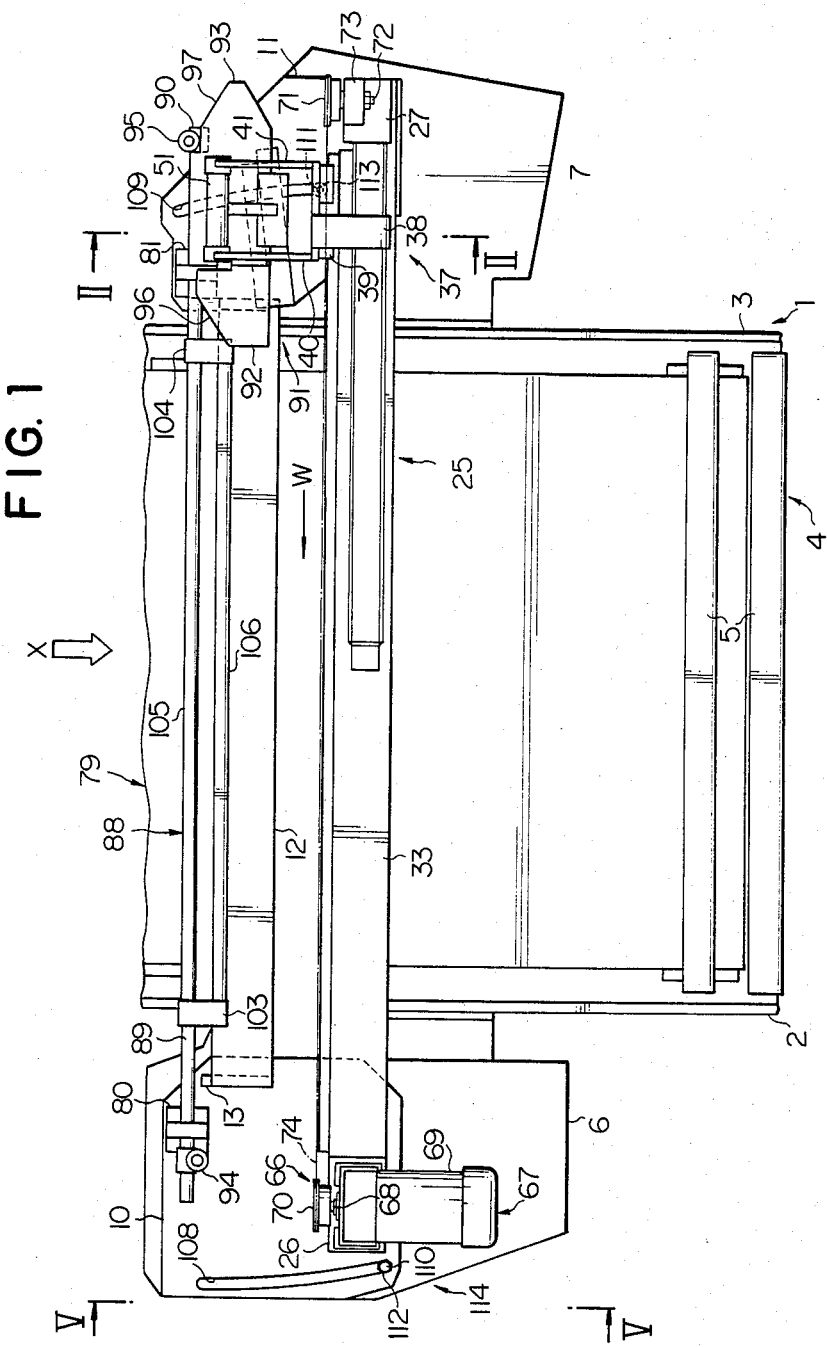
FIG. 1 is a plan view showing an embodiment of the apparatus for cutting an elongate rubbery strip according to the present invention.

Referring to the drawings, first particularly to FIG. 1 thereof, an arrangement to which the present invention appertain is shown comprising a frame structure 1 fixed to, for example, a floor and having longitudinal and transverse directions. The frame structure 1 is provided with a pair of side members 2 and 3 spaced apart substantially in parallel from each other for forming therebetween a free space in which is arranged a conveyor unit 4 having a longitudinal direction substantially coincident with the longitudinal direction of the frame structure 1.

Figure 5:
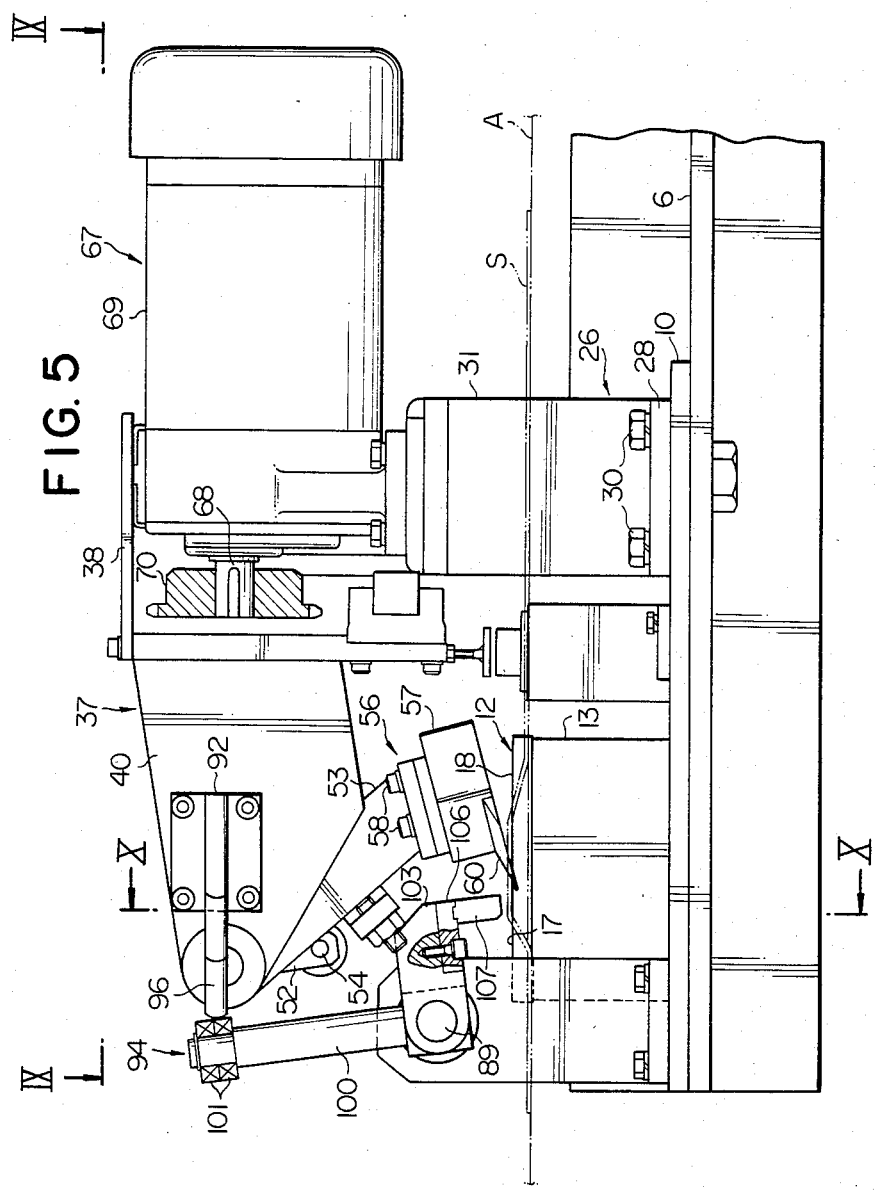
FIG. 5 is a partially cut-away side view of the arrangement illustrated in FIG. 1 and viewed in direction indicated by arrows V in FIG. 1.

The conveyor unit 4 serving as transmitting means has a plurality of rollers 5 which are rotatably supported to the side members through bearing unit (not shown) in such a manner that the axis of rotation of each rollers 5 is substantially in parallel to the transverse direction of the frame structure 1 and that the uppermost portion of each roller 5 is to be on a predetermined plane A, the predetermined plane A being indicated by dot-and-dash line in FIG. 5 of the drawings. The conveyor unit 4 further has a drive motor connected to the rollers 5 by means of a suitable transmitting mechanism consisting of, for example, sprockets and endless chains though not shown in the drawings. The drive motor being electrically connected to a suitable power source across a switch unit, the drive motor and accordingly the rollers are driven for rotation in predetermined directions when the switch unit is closed and, consequently, the conveyor unit 4 is put into operation. On the other hand, the drive motor and accordingly the rollers are brought to stops when the switch unit opens and, consequently, the conveyor unit 4 is put out of operation.

On the upstream side of the conveyor unit 4, is provided suitable storing means such as, for example, a winding drum rotatably supported on a framework by means of bearing units though not shown in the drawings. The winding drum has an outer peripheral surface on which an elongate rubbery strip S is wound up, the elongate rubbery strip S having longitudinal and transverse directions. The elongate rubbery strip S may be formed of non-vulcanized rubber such as, for example, raw rubber having a width W and used for inner liners of pneumatic tires in the embodiment according to the present invention. The winding drum being driven for rotation by means of a suitable drive means such as, for example, a drive motor in a predetermined direction, the elongate rubbery strip S is wound off and thereby placed on the rollers 5 of the conveyor unit 4 in such a manner that the longitudinal direction of the elongate rubbery strip S is substantially coincident with the longitudinal direction of the conveyor unit 4. As the uppermost point of each rollers 5 is to be on the predetermined plane A, the elongate rubbery strip S is movable on the predetermined plane A.

To the side member 2 of the frame structure 1 is connected a stationary base plate 6 projecting outwardly from the outer surface of the side member 2. To the side member 3 of the frame structure 1 is also connected a stationary base plate 7 outwardly projecting in a opposite direction to the stationary base structure 6. Both of the stationary base plates 6 and 7 are disposed in positions spaced apart a predetermined distance from the downstream side of the conveyor unit 4. In order to enhance the mechanical stiffness of the stationary base plate 6 and 7, reinforcement members 8 and 9 are connected between the side members 2 and 3 and the stationary base plate 6 and 7, respectively, only one of which is shown in FIG. 10 of the drawings.

Turning back to FIG. 1 of the drawings, sliding plates 10 and 11 are slidably mounted on the upper surfaces of the stationary base plates 6 and 7, respectively. Over the conveyor unit 4 extends an anvil 12 which has both end portions connected to the sliding plates 10 and 11 through brackets 13 and 14, respectively, and which is located immediately underneath the predetermined plane A and accordingly immediately underneath the elongate rubbery strip S when the elongated rubbery strip S reaches a predetermined position P on the plane A. The anvil has a length significantly greater than the width W of the elongate rubbery strip S and is provided with air passageways 15 and 16 extending throughout the length thereof as will be seen from FIG. 2 of the drawings. Both of the air passageways 15 and 16 are selectively connected to a suitable high pressure air source or a suitable vacuum source across a change-over valve though not shown in the drawings. If the change-over valve is shifted to a first position thereof, the change-over valve provides communication between the suitable vacuum source and the air passageways 15 and 16 while blocking the communication between the suitable high pressure air source and the air passageways 15 and 16. The air passageways 15 and 16 being, thus, connected to the suitable vacuum source, the air which has been entrapped in the air passageways 15 and 16 is consequently forced out of the air passageways 13 and 14 and suction is developed therein. On the other hand, the change-over valve is shifted from the first position to a second position, the change-over valve provides communication between the suitable high pressure air source and the air passageways 15 and 16 while blocking the communication between the suitable vacuum source and the air passageways 15 and 16. The air passageways 15 and 16 being, thus, connected to the suitable high pressure source, the pressurized air is admitted from the suitable high pressure source into the air passageways 15 and 16.

Figure 3:
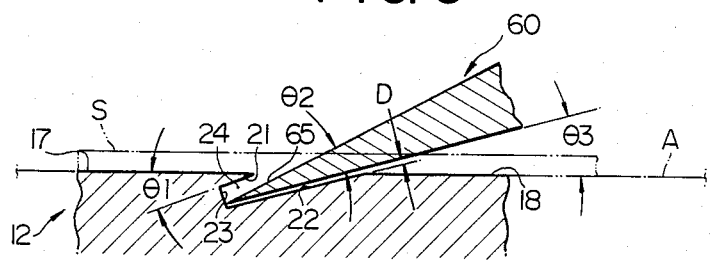
FIG. 3 is a cross sectional view showing, to an enlarged scale, portions of the anvil and the cutting mechanism each forming parts of the arrangement illustrated in FIG. 1.

The anvil has an upper portion consisting of a first upper surface 17 and a second upper surface 18 to which the air passageways 15 and 16 are connected through openings 19 and 20, respectively. The anvil 12 further has an inner surface 21 merging into the first upper surface 17 and directed away from the first upper surface 17 at an acute angle $\theta_1$, a guide surface 22 merging into the second upper surface 18 and spaced apart from the inner surface 21 and a bottom surface 23 merging into the inner and guide surfaces 21 and 22 at both end thereof as shown in FIG. 3. The inner surface 21, the guide surface 22 and the bottom surface 23 form in combination an elongated groove 24 extending in a longitudinal direction of the anvil 12 and having a length greater than the width W of the elongate rubbery strip S.

In FIG. 1 of the drawings, a cutting mechanism embodying the present invention is designated in its entirely by reference numeral 25 and is shown comprising a pair of bracket members 26 and 27 upright on the upper surfaces of the sliding plates 10 and 11, respectively, as will be best shown in FIG. 5. Both of the bracket members 26 and 27 have base plate portions 28 and 29 bolted to the sliding plates 10 and 11, respectively, by means of headed bolts 30 through washers. Both of the bracket members 26 and 27 further have support portions 31 and 32 which upwardly project from the base plate portions 28 and 29 thereof, respectively, and extending in parallel from each other.

Figure 2:
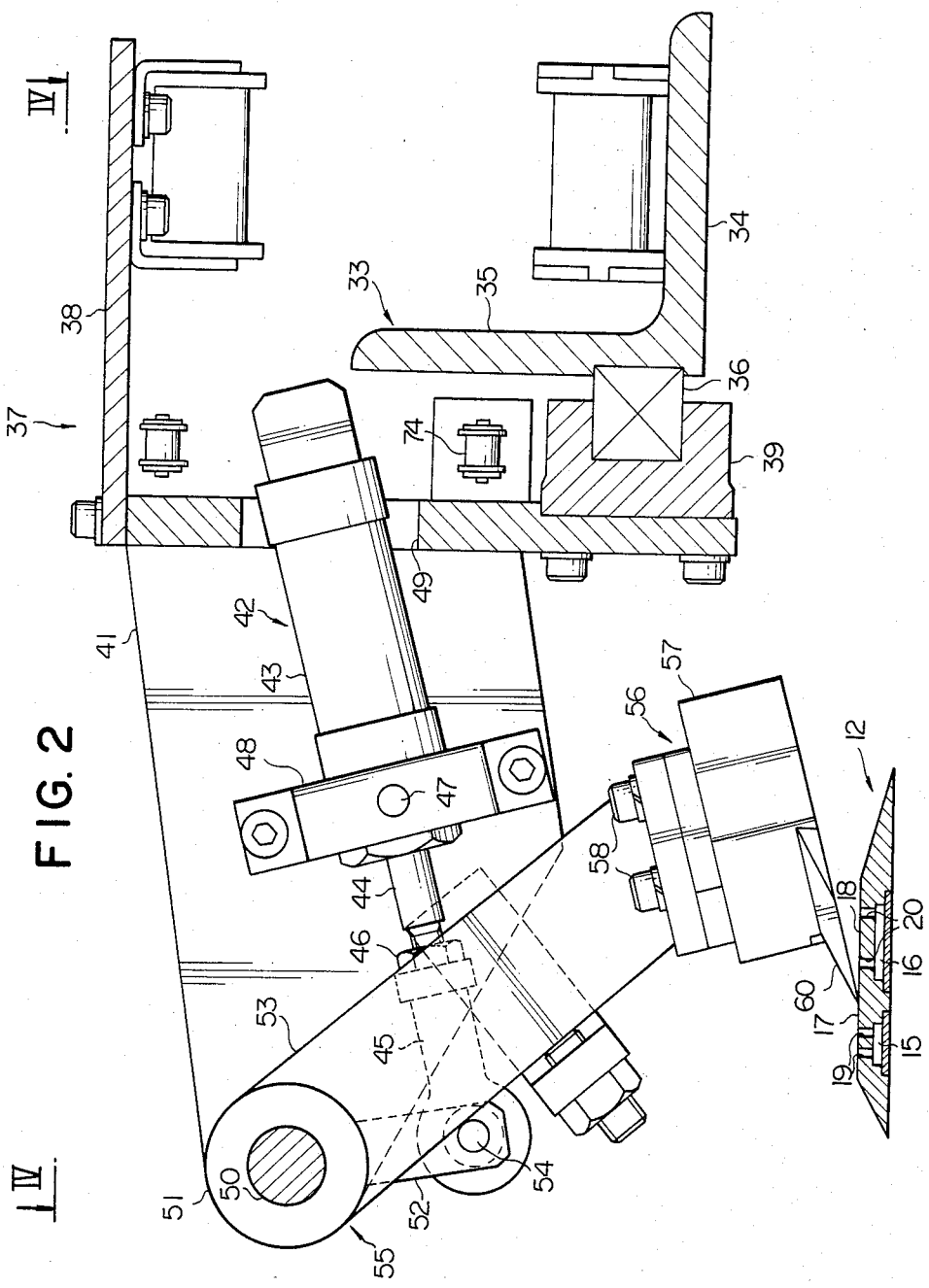
FIG. 2 is a fragmentary cross sectional view taken along the line II—II in FIG. 1.

In the embodiment shown in FIG. 1 of the drawings, the cutting mechanism 25 further comprises a L-shaped support member 33 bridging the upper surfaces of the support portions 31 and 32 of the bracket members 26 and 27 and upwardly spaced apart substantially in parallel with the anvil 12 as will be best seen from FIG. 2 of the drawings. The L-shaped support member 33 has a reinforcement portion 34 and a web portion 35 which projects upwardly from the reinforcement portion 34 and to which is connected a guide rail 36 extending in parallel with the L-shaped support member 33 over the conveyor unit 4. To the guide rail 36 is slidably connected a slider 37 including a inverted L-shaped base member 38 and a joint member 39 so shaped as to be adapted to have received therein the guide rail 36. The joint member 39 slidably interconnecting the inverted L-shaped base member 38 and the rail 36, the slider 37 is able to move along the guide rail 36. The slider 37 further includes a pair of spaced bracket members 40 and 41 projecting from the inverted L-shaped base member 38 for forming therebetween a free space in which a power cylinder 42 is located.

The power cylinder 42 as illustrated in FIG. 2 of the drawings has a cylinder body 43 formed with a cylinder bore, a piston movably received in the cylinder body 43 for dividing the cylinder bore into two variable-volume fluid chambers which are hydrically connected to a suitable high pressure source through a change-over valve though not shown in the drawings. The power cylinder 42 further has a piston rod 44 threaded at one end portion thereof. The piston rod 44 is connected at the other end thereof to the piston and projecting from the cylinder body 43 so as to screwed into an internally threaded bracket member 45 and fixed to the internally threaded bracket member 45 by means of a nut 46.

The front end portion of the cylinder body 43 is rotatably connected through a pin 47 to a retaining member 48 which has semi-circular configuration and is bolted at both ends thereof to one of the spaced bracket members 41 of the slider 29. The inverted L-shaped base member 38 is formed with an opening 49 having a diameter significantly larger than the diameter of the cylinder body 43 so as to permit the rear end portion of the power cylinder 42 to loosely pass therethrough. The power cylinder 42 being, thus, supported on one of the spaced bracket members 41, the power cylinder 42 can be pivotally moved about the center axis of the pin 47 with respect to the spaced bracket members 40 and 41.

The power cylinders 42 being, thus, constructed and arranged, the piston is caused to move in a direction to expand one of the variable-volume fluid chambers defined by the piston and the rear end portion of the cylinder body 43 and thereby causes the piston rod 44 to project from the cylinder body 43 when the change-over valve is shifted to a first position and, consequently, the high pressure fluid is admitted from the high pressure source into one of the variable-volume fluid chambers defined by the piston and the rear end portion of the cylinder body 43. On the other hand, the piston is caused to move in a direction to contract one of the variable-volume fluid chambers described above and thereby causes the piston rod 44 to retract into the cylinder 43 body when the change-over valve is shifted from the first position to a second position and the high pressure fluid is admitted from the high pressure source into the other of the variable volume fluid chambers defined by the piston and the front end portion of the cylinder body 43.

The slider 37 further include a rod 50 connected at both ends thereof to the leading end portions of the spaced brackets members 40 and 41 and extending in parallel from the guide rail 36, a sleeve member 51 rotatably supported on the rod 50 and two arm members 52 and 53 downwardly projecting forwardly from the sleeve member 51. One of the arm members 52 is connected at the leading end thereof to the internallythreaded bracket member 45 by means of a pin 54 so as to rotate the sleeve member 51 and accordingly the other arm member 53 about the center axis of the sleeve member by the force produced by the power cylinder 42. The arm member 52 has a measurement in a longitudinal direction thereof so that the leading end portion of the arm member 52 is caused to turn along an arcuate path having a radius of pivotal motion approximately equal to the measurement of the arm member 52. The arm member 53 also has, in a longitudinal direction thereof, a measurement larger than the measurement of the arm member 52 so that the leading end portion thereof is caused to turn along an arcuate path having a radius of pivotal motion larger than the radius of pivotal motion of the arcuate path of the arm member 52. As the radius of pivotal motion of the arcuate path is larger than the radius of pivotal motion of the arcuate path, the leading end of the arm member 53 is caused to angularly move along the arcuate path which has a chord larger than a chord of the arcuate path of the leading end of the arm member 52. The power cylinder 42, the guide rod 50, sleeve member 51 and a pair of arm members 52 and 53 constitute as a whole a driving device generally indicated at 55.

Figure 6:
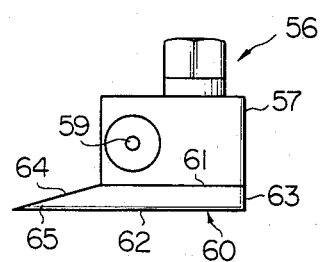
FIG. 6 is a side view showing, to an enlarged scale, parts of the cutting mechanism forming part of the arrangement illustrated in FIG. 1.

The cutting mechanism 25 in the embodiment illustrated in the drawings further has a heating device 56 carried at the leading end of the arm member 53. The heating device 56 has a thermal accumulator 57 which is connected to the leading end of the arm member 53 by means of bolts 58 and in which a heating coil 59 is received as will be best shown in FIG. 6 of the drawings. The heating coil 59 is electrically connected across an electric switch unit to a suitable power source by means of a lead wire though not shown in the drawings. The heating coil 59 produces a certain quantity of heat so as to heat the thermal accumulator 57 to a certain temperature T1 when the switch unit closed. To the lower surface of the thermal accumulator 57 is attached a cutting plate 60 serving as a cutting device and projecting beyond the rear end of the thermal accumulator 57 so as to be pressed against the elongated rubbery strip S in the predetermined position P without causing the thermal accumulator 57 to be in contact with the rubbery strip S. The cutting plate 60 has two pairs of surfaces one of which is substantially in parallel from each other and consist of an upper surface 61 and a lower surface 62, the lower surface 62 extending beyond the rear end of the thermal accumulator 57. The upper surface 61 of the cutting plate 60 being tightly in contact with the lower surface of the thermal accumulator 57, the heat produced by the heating coil 59 is transmitted thereto due to the difference between the temperature of the thermal accumulator and the temperature of the cutting plate 60. The other pair of surfaces consist of front and rear surfaces 63 and 64 merging into the upper and lower surfaces 61 and 62, respectively. As a rear portion defined by the rear and lower surfaces 64 and 62 is made harder by, for example, heat treatment, the rear portion serves as a cutting edge portion designated by reference numeral 65.

It is advisable that the rear surface 64 of the cutting plate 60 is directed away from the lower surface 62 thereof at an angle $\theta_2$ fallen within a range between about 5 degrees and about 20 degrees so as to sharply cut the elongate rubbery strip S. The angle $\theta_2$ between the rear and lower surfaces 64 and 62 has been ascertained experimentally. If, namely, the angle $\theta_2$ between the rear and lower surfaces 64 and 62 of the cutting plate 60 is selected less than about 5 degrees, the cutting edge portion 65 is liable to break off by the reason of insufficient mechanical stiffness. In the case of selection larger than about 20 degrees, the description will be made hereinafter in conjunction with biasing means.

The heat transmitted through the thermal accumulator 57 into the cutting plate 60 causes the temperature in the cutting edge portion 65 to rise to a certain value. The heating coil 59 is, consequently, adapted to heat the cutting edge portion 65 of the cutting plate 60 to heat a constant temperature T2 ranging between about 150 degrees and about 400 degrees in centigrade.

The cutting plate 60 being connected to the leading end of the arm member 53 through the heating device 56, the cutting plate 60 is driven for rotation in a clockwise direction in FIG. 2 of the drawings and is thereby moved from a uppermost position to a cutting position C when the piston rod 44 is caused to project from the cylinder body 43. On the other hand, the cutting plate 60 is driven for rotation in a counter-clockwise direction in FIG. 2 of the drawings and is thereby moved out of the cutting position C when the piston rod 44 is caused to retract into the cylinder body 43.

In the cutting position C, the cutting edge portion 65 of the cutting plate 60 is received in the elongated groove 24 of the anvil 12 throughout the length thereof through the predetermined plane A.

It is advisable that the lower surface 62 of the cutting plate 60 extends at an angle $\theta_3$ ranging between about 10 degrees and 40 degrees with respect to the predetermined plane A when the cutting plate 60 is caused to move in the cutting position C. If the angle $\theta_3$ between the lower surface 62 of the cutting plate 60 and the predetermined angle A is selected less than 10 degrees, the elongate rubbery strip S is liable to be subjected to deformation due to increase in contact area of the cutting surface. The deformation of the rubbery strip S makes it difficult to cut the rubbery strip into segments G each having a predetermined length. On the other hand, the rubbery strip is not used in manufacturing pneumatic tire S if the rubbery strip is cut at an angle larger than about 40 degrees.

Furthermore, it is preferable that the lower surface 62 of the cutting plate 60 is in parallel to and at spacing from the guide surface 22 of the anvil 12 by a distance D fallen within a range from about 0.0 mm to about 0.2 mm when the cutting plate 60 is assumed in the cutting position C. If the cutting plate 60 assumes the cutting position C with the lower surface 62 extending at an angle with respect to the guide surface 22 of the anvil 12, it is difficult to obtain a better cutting surface as a result of deterioration in the cutting effect. If the lower surface 62 of the cutting plate 60 is spaced apart from the guide surface 22 by the distance D larger than about 0.2 mm, it is also difficult to obtain a better cutting surface due to viscoelasticity of the rubbery strip S.

Figure 8:
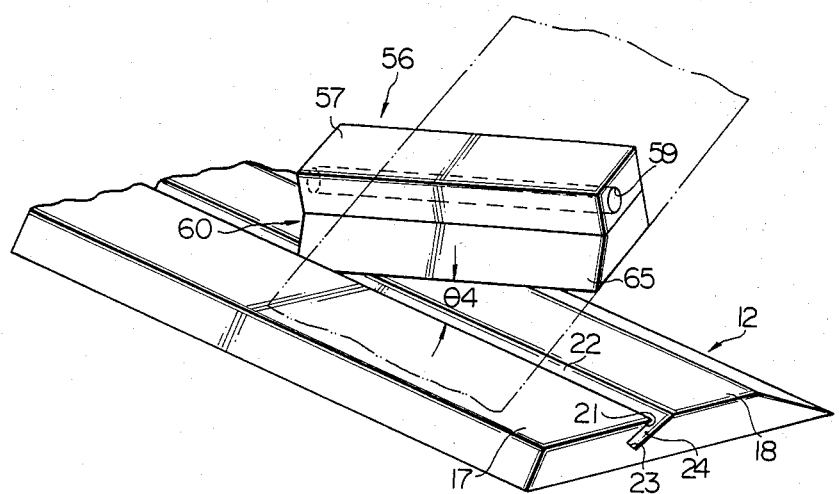
FIG. 8 is a perspective view showing, to an enlarged scale, parts of the anvil and the cutting mechanism each forming parts of the arrangement illustrated in FIG. 1.

The cutting mechanism 25 may be arranged in such a manner that the cutting edge portion 65 of the cutting plate 60 is directed from the predetermined plane A at an angle $\theta_4$ ranging between 5 degrees and 20 degrees, the angle $\theta_4$ being taken on a plane B coplanner with the lower surface 62 of the cutting plate 60 as shown in FIG. 8 of the drawings.

Figure 4:
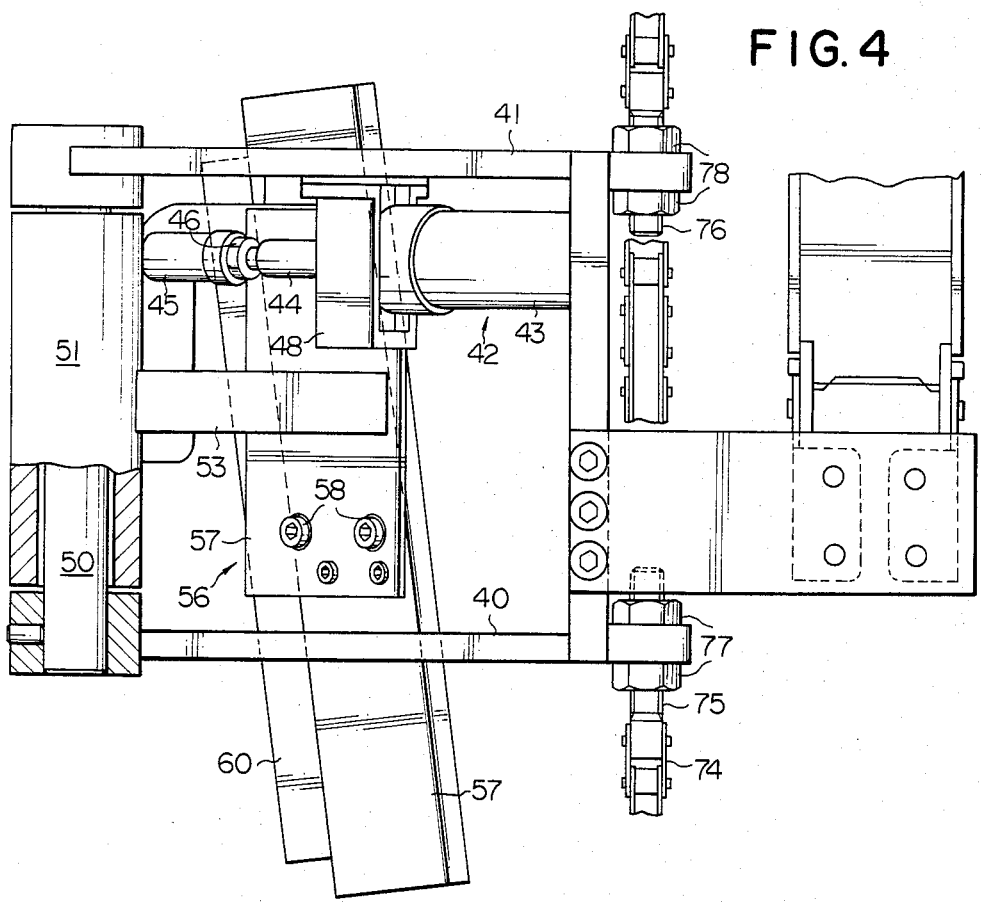
FIG. 4 is a partially cut-away plan view of the arrangement illustrated in FIG. 2 and viewed in direction indicated by arrows IV in FIG. 2.
Figure 9:
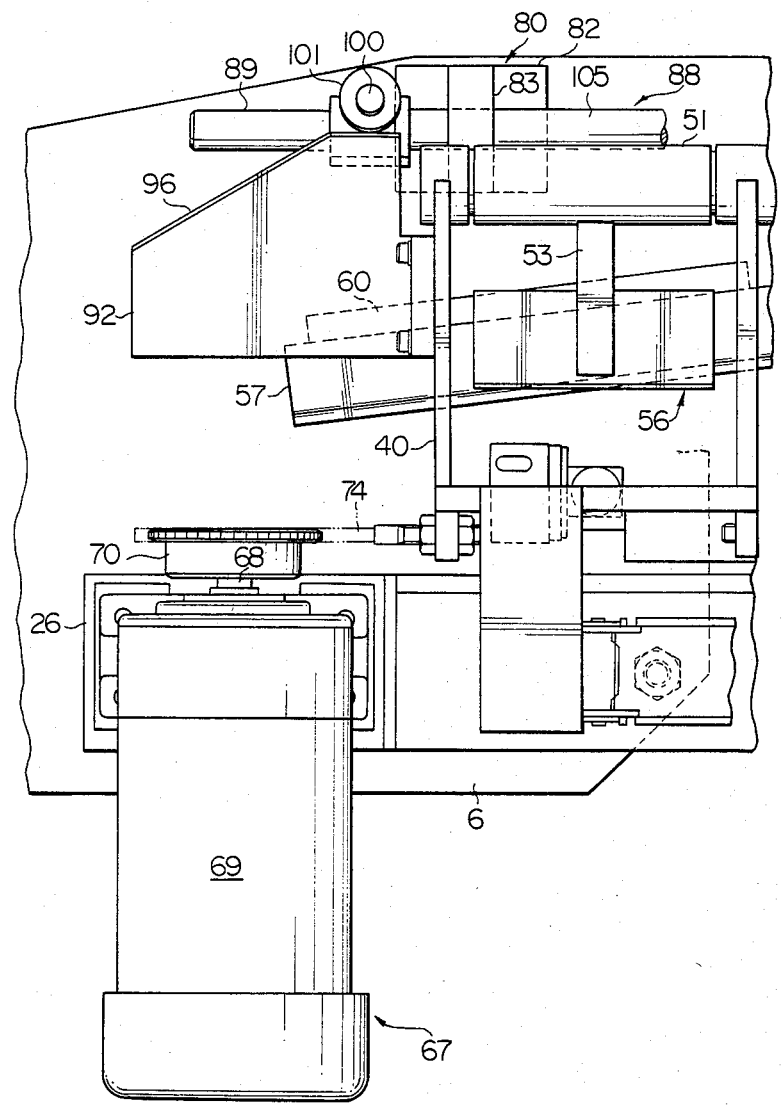
FIG. 9 is a plan view of the arrangement illustrated in FIG. 5 and viewed in direction indicated by arrows IX in FIG. 5.

Turning back to FIG. 1 of the drawings, the cutting mechanism 25 according to the present invention further has a transfer device 66 which is provided with an electric motor 67 mounted on the upper surface of the bracket member 26. The electric motor 67 has an output shaft 68 rotatably supported on a casing structure 69 and projecting therefrom in a direction perpendicular to the longitudinal direction of the guide rail 36. The electric motor 67 is electrically connected to a suitable power source across an electric switch unit having two pairs of contact elements so that the output shaft 68 is driven for rotation in either direction depending upon the polarity of the voltage supplied to the electric motor through either of the two pairs of contact elements. The transfer device 66 is further provided with a pair of sprocket wheels 70 and 71 one of which is fixedly connected to the leading end portion of the output shaft 68 by means of, for example, a key (see FIG. 9 of the drawings) and the other of which is also fixedly connected to a shaft 72 rotatably supported by a pillow block 73 mounted on the upper surface of the bracket member 27. Between the sprocket wheels 70 and 71 passes and stretches a chain belt 74 forming part of the transfer device 66 and having both ends which are connected to threaded members 75 and 76, respectively, as will be seen from FIG. 4 of the drawings. The threaded members 75 and 76 are passed through holes respectively formed in the spaced bracket members 40 and 41 and are fixed to the spaced bracket members 40 and 41 by means of two pairs of adjusting nuts 77 and 78, respectively, so as to adjust the looseness of the chain belt 74. The slider 37 and accordingly the heating device 56 as well as the cutting plate 60 being slidably supported on the L-shaped support member 33 through the guide rail 36, the slider 37, the heating device 56 and the cutting plate 60 are caused to move in a direction indicated by arrow W or vice versa across the conveyor unit 4 when an exciting current is fed to the electric motor 67 through either of the two pairs of contact elements of the switch unit.

Referring to the FIG. 1 of the drawings, the apparatus according to the present invention further comprises biasing means 79 which has a pair of support brackets 80 and 81 respectively mounted on the sliding plates 10 and 11 and spaced apart from the bracket members 26 and 27 in directions perpendicular to the longitudinal direction of the L-shaped support member 33, respectively. Each of the support brackets 80 or 81 mounted on the sliding plate 10 or 11 is provided with a lower base portion 82 in face-to-face contact with the sliding plate 10 or 11 and an upper support portion 83 upright on the lower base portion 82 as will be seen from FIG. 10 of the drawings, the lower base portion 82 being fixed to the sliding plate 10 or 11 by means of bolts 84. Both of the upper support portions 83 of the support brackets 80 and 81 are formed with bores 85 having center axes aligned with each other. In each of the bores 85 is received a bearing unit 86 which is positioned by means of a snap ring and on which a shaft 88 is rotatably supported. The shaft extends between the bearing units 86 and has longitudinal end portions 89 and 90 each projecting from the bearing unit 86.

The biasing means 79 further has a cam mechanism 91 consisting of a pair of cam members 92 and 93 and a pair of driven members 94 and 95. The cam members 92 and 93 are fixedly connected to the spaced bracket members 40 and 41, respectively, and protrude in opposite directions to each other. The cam member 92 has a cam surface 96 formed on the rear end thereof and extending obliquely to the center axis of the shaft 88. The cam member 93, on the other hand, has a cam surface 97 formed on the rear end thereof. The cam surfaces 96 and 97 respectively formed on the rear ends of the cam members, however, extend symmetrically with respect to each other. The driven member 94 has a hub portion 98 fixedly connected to one of the longitudinal end portions 89 of the shaft 88 by means of a pin 99, a rod portion 100 radially projecting upwardly from the hub portion 98 and a pair of rollers 101 rotatably supported on the leading end of the rod portion 100 and engageable with the cam surface 96 of the cam member 92. The driven member 95, also, has a hub portion fixedly connected to the other of the longitudinal end portions 90 of the shaft 88, a rod portion radially projecting upwardly from the hub portion and a pair of rollers rotatably supported on the leading end of the rod portion 60 and engageable with the cam surface 97 formed on the rear end of the cam member though not designated by reference numerals in the drawings. As a sleeve member 102 is provided between the bearing unit 86 and the hub portion 98 of the driven member 94, the driven member 94 is caused to be accurately spaced apart from the support bracket 80 by a predetermined distance so that the cam surface 96 of the cam member 92 can be always brought into engagement with the driven member 94 at a predetermined left hand position L in FIG. 1 of the drawings. Though not shown in the drawings, a sleeve member being also provided between the bearing unit accommodated in the support bracket 81 and the hub portion of the driven member 95, the cam surface 97 of the cam member can be always brought into engagement with the driven member 95 at a predetermined right hand position R in FIG. 1 of the drawings.

Figure 11:
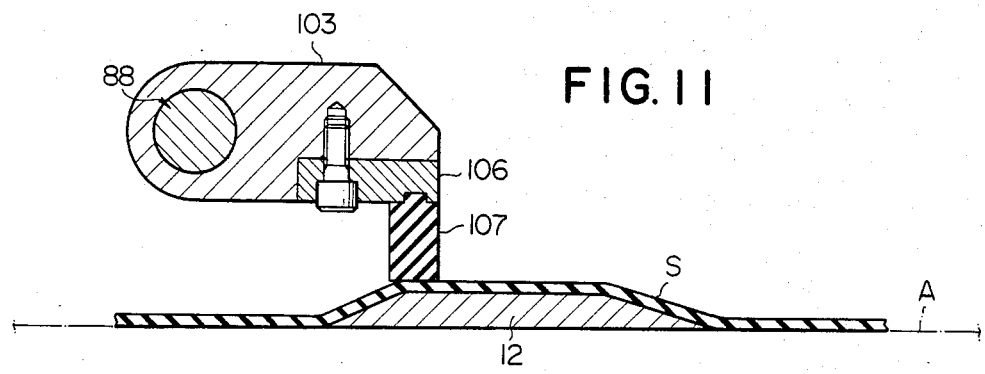
FIG. 11 is a cross sectional view taken along the line XI—XI in FIG. 10.

The biasing means 79 according to the present invention further has a pair of arm members 103 and 104 connected to the intermediate portion 105 of the shaft 88 at positions adjacent to the support brackets 80 and 81, respectively. The arm members 103 and 104 radially projects from the shaft 88 and carry a support member 106 at the leading ends thereof which extends substantially in parallel to the anvil 12 and to which a resilient member 107 is attached by method of vulcanization as shown in FIG. 11 of the drawings. It is preferable for the resilient member 107 to be formed of rubber having hardness of JIS (Japanese Industrial Standards) 20 degrees. The resilient member 107 has a length substantially equal to or slightly larger than the width W of the elongate rubbery strip S so as to be in pressing contact with the rubbery strip S throughout the width W thereof when the elongate rubbery strip S reaches the predetermined position P and, then, the shaft 88 is driven for rotation in a clockwise direction in FIG. 11 of the drawings due to gravity forces of the arm members 103 and 104, support member 106 and so forth. On the other hand, the resilient member 107 is spaced apart from the rubbery strip S in the predetermined position P when the shaft 88 is driven for rotation in a counterclockwise direction in FIG. 11 of the drawings due to functions between the cam members 92 and 93 and the driven members 94 and 95.

If the angle $\theta_2$ between the rear and lower surfaces 64 and 62 is greater than 40 degrees, it is necessary to arrange the biasing means 79 in such a manner as to be significantly spaced apart from the elongated groove 24 of the anvil 12 for preventing the thermal accumulator 57 from interferences with the biasing means 79. As a consequence, the leadng end portion of the elongate rubbery strip S is liable to move by the reason of lacking the pressing force exerted thereon.

Figure 7:
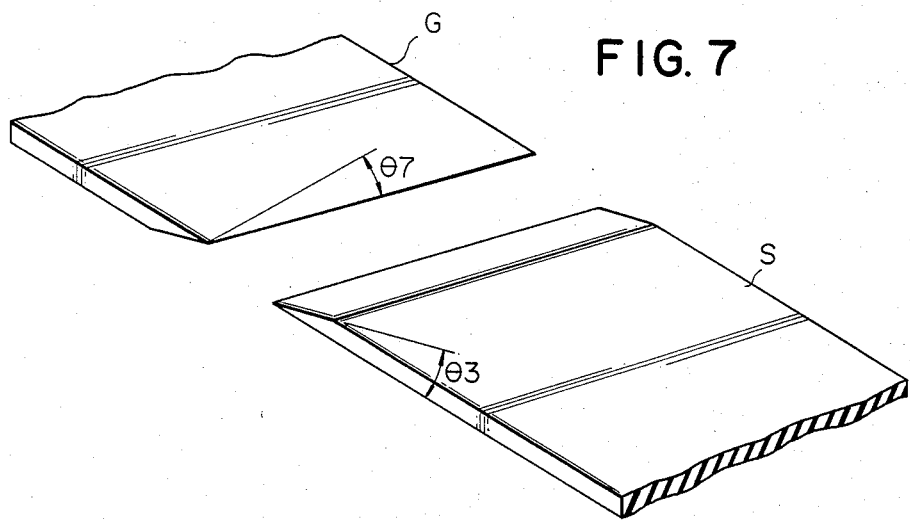
FIG. 7 is a perspective view showing part of the elongate rubbery strip.

The sliding plates 10 and 11 slidably mounted on the stationary base plates 6 and 7, respectively, are formed with arcuate slots 108 and 109 having radius of curvatures substantially equal in length to each other. Through the respective arcuate slots 108 and 109 upwardly project guided bolts 110 and 111 which are embedded in the stationary base plates 6 and 7, respectively. As the guided bolts 110 and 111 are spaced apart from each other by a distance approximately equal to the radius of curvature of the arcuate slot 108 or 109, the sliding plate 10 is caused to turn on the stationary base plate 6 about the center axis of the guided bolt 111. The sliding plate 11 being also caused to turn on the stationary base plate 7 about the center axis of the guided bolt 110, the angles $\theta_5$ and $\theta_6$ between the transverse direction of the conveyor unit 4 and the longitudinal direction of the L-shaped guide member 33 and between the transverse direction of the conveyor unit 4 and the longitudinal direction of the anvil 12 are able to be varied for alternation of an angle $\theta_7$ between the cutting surface and the transverse direction of the segment G (see FIG. 7 of the drawings).

Reference numerals 112 and 113 respectively designate nuts each screwed on the guided bolt 110 and 111 or for locking the sliding plate 10 or 11 in an arbitrary position on the stationary base plate 6 or 7. The sliding plates 10 and 11 formed with the arcuate slots 108 and 109, the guided bolts 110 and 111 and the nuts 112 and 113 are constituted as a whole adjusting means 114.

Prior to cutting operation of the elongate rubbery strip S, the nuts 112 and 113 are loosened so as to be able to adjust the sliding plates 10 and 11 and accordingly the L-shaped support member 33 and the anvil 12 in desired angular positions with respect to the transverse direction of the conveyor unit 4. When the sliding plates 10 and 11 are adjusted in the desired angular positions, the nuts 112 and 113 are screwed on the guided bolts 110 and 111 for locking the sliding plates 10 and 11 in the desired angular positions. Furthermore, the change-over valve connected to the passageways 15 and 16 is shifted to the first position thereof so that the air entrapped in the passageways 15 and 16 through the openings 19 and 20 are forced out and suction is developed therein. On the other hand, the change-over valve connected to the power cylinder 42 is shifted to the second position thereof so that the piston rod 44 is caused to retract with a resultant of causing the cutting plate 60 to move out of the cutting position C. As the slider 37 is caused to move into the right hand position R in FIG. 1 of the drawings by means of the electric motor 67 with the closure of the electric switch unit, the cam surface 97 of the cam member 93 is brought into abutting engagement with the driven member 95 and, then, the resilient member 107 is caused to move in the counter-clockwise direction in FIG. 11 of the drawings and is thereby moved away from the rubbery strip S. The cutting plate 60 is heated to the constant temperature T2 by means of the heating coil 59 as a result of closing of the electric switch unit.

Under these conditions, the winding drum being driven for rotation by means of the drive motor through a predetermined angle or by a predetermined number of turns, the elongate rubbery strip S on the outer peripheral surface of the winding drum is wound off and thereby placed on the conveyor unit 4. When the leading end of the elongated rubbery strip S is placed on the conveyor unit 4, the rollers 5 are driven for rotation by means of the drive motor through the transmitting mechanism, the rollers being synchronized with the winding drum for preventing the rubbery strip S from producing wrinkles.

The winding drum and, concurrently, the rollers being driven for rotation, the elongate rubbery strip S advances in a direction indicated by arrow X on the predetermined plane A and, then, the winding drum and the rollers are brought into stops when the leading end of the elongate rubbery strip S reaches the predetermined position P in which the anvil is overlaid with the leading end portion of the rubbery strip S. The suction being developed in the passageways 15 and 16 and accordingly the openings 19 and 20, the leading end portion of the rubbery strip S is attracted on the upper portion, viz., the first and second upper surfaces 17 and 18 of the anvil 12 by a force due to difference of the pressure between the suction and the atmospheric air. In this way, the leading end portion of the rubbery strip S is closely held against the first and second upper surfaces 17 and 18 of the anvil 12 and, consequently, the leading end portion is maintained stationary with respect to the anvil 12.

When the leading end of the rubbery strip S reaches the predetermined position P, the change-over valve connected to the power cylinder 42 is shifted from the second position to the first position thereof. The change-over valve being, thus, shifted to the first position thereof, the piston rod 44 projects from the cylinder body 43 and, consequently, the arm member 52 is driven for rotation with a force produced by the power cylinder 42. As the arm member 52 rotates in the clockwise direction in FIG. 2 of the drawings, the arm member 53 as well as the cutting plate 60 also rotate in the clockwise direction in FIG. 2 of the drawings and, thereby, the cutting edge portion 65 of the cutting plate 60 is pressed against the elongate rubbery strip S.

The cutting edge portion 65 of the cutting plate 60 being, thus, pressed against the rubbery strip S with the heating condition, the cutting plate 60 is smoothly moved into the cutting position C through the rubbery strip S. When the rubbery strip S is cut by means of the cutting plate 60, the rubbery strip S extracts the heat from the cutting edge portion 65 of the cutting plate 60 so that the cutting edge portion 65 is cooled. However, the thermal accumulator 57 is provided in association with the cutting plate 60 the temperature of the cutting edge portion 65 is rised to the constant value of T2 again.

When the cutting plate 60 is moved into the cutting position C, the exciting current is supplied to the electric motor 67 through one of the two pairs of contact elements of the electric switch unit and, consequently, the chain belt 74 and accordingly the slider 37 are driven to travel in the direction indicated by arrow W. The slider being, thus, driven to travel to the left hand position L in FIG. 1 of the drawings, not only the shaft 88 but also the resilient member 107 carried on the support member 106 rotate in the clockwise directions in FIG. 11 as a result of the disengagement of the cam member 93 and the driven member 95.

As a consequence, the leading end portion of the rubbery strip S is sandwiched between the resilient member 107 and the first upper surface 17 of the anvil 12 and, consequently, the leading end porion of the rubbery strip S is pressed against the first upper surface 17 of the anvil 12. The rubbery strip S being, thus, not only attracted by the force due to the difference of the pressure between the suction and the atmospheric air but also pressed against the first upper surface 17 of the anvil 12 by the gravity forces of the resilient member 107, support member 106 and so forth, the leading end portion of the rubbery strip S is held in the predetermined position P during the travel of the cutting edge portion 65.

When the cutting edge portion 65 of the cutting plate 60 is arrived at the left hand position L in FIG. 1 of the drawings, the cutting plate 60 cuts off the segment G from the elongate rubbery strip S, the segment and accordingly the rubbery strip having the cutting surfaces, respectively, each extending obliquely to the longitudinal direction thereof the angle $\theta_7$ approximately equal to the angle $\theta_5$ or $\theta_6$ between the longitudinal direction of the L-shaped support member 33 or the anvil 12 and the transverse direction of the conveyor unit 4.

If the slider 37 reaches the left hand position L in FIG. 1 of the drawings, the cam surface 96 of the cam member 92 is brought into abutting engagement with the driven member 94 so that the shaft 88 is driven for rotation in the counter-clockwise direction in FIG. 11 of the drawings. The shaft 88 being, thus, driven for rotation, the resilient member 107 is moved away from the upper surface of the segment G for eliminating the gravity forces acting thereon. Furthermore, the pressurized air being admitted into not only the passageways 15 and 16 but also the openings 19 and 20 from the high pressure source as a result of shifting the change-over valve from the first position to the second position thereof, the segment G as well as the elongate rubbery strip S are slightly lifted by functions of the flow of the air delivered from the openings 19 and 20.

Prior to transfer of the slider 37, the cutting plate 60 is moved out of cutting position C. Namely, the high pressure source is hydraulically connected to the variable-volume chamber defined by the piston and the front end portion of the cylinder body 43 while blocking the communication between the high pressure source and the variable-volume chamber defined by the piston and the rear end portion of the cylinder body 43 as a result of shifting the change-over valve from the first position to the second position thereof, so that the piston rod 44 is caused to retract by the force exerted on the piston. As a result of retraction of the piston rod 44 of the power cylinder 42, the sleeve member 51 and accordingly the arm members 52 and 53 are driven for rotation in the counterclockwise direction in FIG. 2 of the drawings and, consequently, the cutting plate 60 carried at the leading end of the arm member 53 through the thermal accumulator 57 is moved away from the anvil 12. The cutting plate being, thus, moved out of the cutting position C thereof, not only the segment G but also the elongate rubbery strip S are movable without occurring any interferences with the cutting plate 60.

Under these conditions, the exciting current being supplied to the electric motor 67 forming part of the transfer device 66 as a result of closure of the other pair of contact elements of the electric switch unit, the electric motor is driven for rotation and, consequently, the chain belt 74 is driven for travel in the opposite direction of arrow W in FIG. 1 of the drawings. The chain belt 74 being, thus, driven to travel in the opposite direction of arrow W, the slider 37 as well as the cutting plate 60 carried at the leading end of the arm member 53 are also moved in the opposite direction of arrow W.

If the cam surface 96 of the cam member 92 is brought out of abutting engagement with the driven member 94 as a result of movement of the slider 37, the resilient member 107 is driven for rotation about the center axis of the shaft 88 in the clockwise direction in FIG. 11 of the drawings by the gravity forces of the support member 106, arm members 103 and 104 and so forth and, consequently, is brought into pressing contact with the upper surface of the segment G. The resilient member 107 is, however, moved away from the upper surface of the segment G when the slider 37 reaches the right hand position R in FIG. 1 of the drawings and, then, the cam surface 97 of the cam member 93 is brought into abutting engagement with the driven member 95. When the resilient member 107 is moved away from the upper surface of the segment G, the exciting current is supplied to the power motor connected to the rollers as a result of closure of the electric switch unit. As a consequence, the motor and accordingly the rollers are driven for rotation in the direction to cause the segment G and the elongate rubbery strip S to forwardly advance. The exiting current being also supplied to the electric motor connected to the winding drum as a result of closure of the electric switch unit, the winding drum is concurrently driven for rotation in the direction to winding off the elongate rubbery strip S.

The rollers as well as the winding drum being, thus, driven for rotation in the directions described above, respectively, the segment G and the elongate rubbery strip S are respectively advanced until the leading end of the elongate rubbery strip is spaced apart from the predetermined position P by a distance approximately equal to the length of the inner liner of the pneumatic tire so as to repeat the cutting operation.

Although particular embodiment of the present invention have been shown and described, it will be obvious to those skilled in the art that various modifications may be made without departing from the spirit and scope of the present invention.

In the embodiment described hereinbefore, the chain belt 74 is driven for travel by means of the electric motor 67. In a modification, however, instead of the electric motor 67, a power cylinder may be employed so as to drive the chain belt 74 in the direction indicated by arrow W and vice versa.

Furthermore, the apparatus according to the present invention is used for preparing the inner liner of the pneumatic tire as described above. However, the apparatus proposed by the present invention will find a wide variety of practical application for manufacturing the pneumatic tire, such an apparatus will prove advantageous especially when used for preparing side wall members and tread members of pneumatic tires as well as resilient belt members of conveyor units.

In the embodiment shown in FIGS. 1 to 11, the biasing means 79 are arranged to be in pressing contact with the first upper surface 17 of the anvil 12 when the leading end of the elongate rubbery strip S reaches the predetermined position P. In another modification, biasing means 79 may be arranged in such a manner to be in pressing contact with the second upper surface 18 of the anvil 12 when the leading end of the elongate rubbery strip S reaches the predetermined position P.

What is claimed is:

1. An apparatus for cutting an elongate non-vulcanized rubbery strip movable on a predetermined plane and having longitudinal transverse directions, comprising:

transmitting means operative to transmit said elongate non-vulcanized rubbery strip in the longitudinal direction thereof and to be brought to a stop when the elongate non-vulcanized rubbery strip reaches a predetermined longitudinal position on said predetermined plane;

an anvil located underneath the predetermined plane and formed with an elongated groove extending obliquely to the transverse direction of said elongate non-vulcanized rubbery strip, the anvil having an upper surface substantially in parallel with said predetermined plane, an inner surface directed away from the upper surface at an acute angle and a guide surface spaced apart from the inner surface, the inner surface and the guide surface forming in combination said elongated groove;

a cutting mechanism arranged in opposing relation with said anvil across said predetermined plane and provided with a cutting device having a cutting edge portion, a heating device operative to heat the cutting edge portion of the cutting device to a predetermined temperature, a driving device operative to move the cutting device into or out of a cutting position in which the cutting edge portion of the cutting device is received in the elongated groove of said anvil through the elongate rubbery strip in said predetermined longitudinal position and a transfer device operative to move the cutting device along the elongated groove of said anvil when the cutting device is assumed in the cutting position, said cutting device being operative to cut said elongate non-vulcanized rubbery strip on bias throughout the width thereof in cooperation with said anvil when the cutting device is moved along the elongated groove of said anvil;

said cutting edge portion of said cutting device being directed away from the upper surface of said elongate non-vulcanized rubbery strip at an angle ranging between about 5 degrees and 20 degrees when the cutting device is moved along said elongated groove of said anvil and being constituted by upper and lower surfaces, the upper surface of said cutting edge portion being directed from said lower surface of said cutting edge portion at an angle ranging between about 5 degrees and about 20 degrees;

said cutting device further having a lower surface directed away from the upper surface of said elongate non-vulcanized rubbery strip at an angle ranging between about 10 degrees and about 40 degrees when the cutting device is assumed in said cutting position;

said guide surface of said anvil extending substantially in parallel with said lower surface of said cutting device and being spaced apart from said lower surface of said cutting device by a distance falling within a range between about 0.0 mm and about 0.2 mm, when the cutting device is assumed in said cutting position;

biasing means shiftable into or out of a pressing position in which the biasing means presses said elongate non-vulcanized rubbery strip against said anvil for maintaining the elongated rubbery strip in said predetermined longitudinal position, the biasing means being in contact with said upper surface of said anvil across said elongate rubbery strip throughout the width of the elongate rubbery strip; and adjusting means operative to adjust positions of said anvil and said cutting mechanism with respect to said elongate non-vulcanized rubbery strip in said predetermined longitudinal position.

* * * * *